(12) United States Patent
Longo et al.

(10) Patent No.: US 8,770,427 B2
(45) Date of Patent: Jul. 8, 2014

(54) RECLOSABLE RIGID CONTAINER ASSEMBLY

(75) Inventors: Eugenio Longo, Rho (IT); Andrea Fanfani, Milan (IT)

(73) Assignee: Cryovac, Inc., Duncan, SC (US)

( * ) Notice: Subject to any disclaimer, the term of this patent is extended or adjusted under 35 U.S.C. 154(b) by 2043 days.

(21) Appl. No.: 10/576,923

(22) PCT Filed: Sep. 23, 2004

(86) PCT No.: PCT/EP2004/052281
§ 371 (c)(1),
(2), (4) Date: Feb. 26, 2007

(87) PCT Pub. No.: WO2005/039997
PCT Pub. Date: May 6, 2005

(65) Prior Publication Data
US 2007/0272688 A1 Nov. 29, 2007

(30) Foreign Application Priority Data

Oct. 22, 2003 (EP) ..................................... 03024237
Jul. 22, 2004 (EP) ..................................... 04103498

(51) Int. Cl.
*B65D 43/16* (2006.01)
(52) U.S. Cl.
USPC ..................................................... 220/359.1
(58) Field of Classification Search
USPC .................. 220/359.1, 254.1, 839, 4.21–4.23
See application file for complete search history.

(56) References Cited

U.S. PATENT DOCUMENTS

| | | | |
|---|---|---|---|
| 4,079,567 A | 3/1978 | Spruyt et al. | |
| 4,283,458 A * | 8/1981 | Igarashi et al. | 503/208 |
| 4,440,311 A | 4/1984 | Hoffman et al. | |
| 4,529,100 A | 7/1985 | Ingemann | |
| 4,971,220 A * | 11/1990 | Kaufman et al. | 220/832 |
| 5,634,567 A * | 6/1997 | Hekal | 220/359.3 |
| 5,846,582 A | 12/1998 | Mayfield et al. | |
| 6,112,928 A * | 9/2000 | Black et al. | 220/6 |
| 2003/0152669 A1 | 8/2003 | Vadhar et al. | |

FOREIGN PATENT DOCUMENTS

| | | |
|---|---|---|
| EP | 0 481 943 A1 | 4/1992 |
| EP | 1 127 809 | 8/2001 |
| FR | 2618411 | 1/1989 |
| FR | 2827841 | 1/2003 |
| GB | 2382569 A * | 6/2003 |
| JP | 3-53476 | 5/1991 |
| WO | 00/53510 | 9/2000 |
| WO | 2004/048200 | 6/2004 |

* cited by examiner

*Primary Examiner* — Steven A. Reynolds
*Assistant Examiner* — King M Chu
(74) *Attorney, Agent, or Firm* — Thomas C. Lagaly (57) ABSTRACT

There is described a rigid or semi-rigid container assembly 10 (110) for the packaging of food products. The container assembly 10 (110) comprises a support 20 (120) and a frame 30 (130). Support 20 (120) comprises an outwardly extending peripheral flange 21 (121) which is shaped to cooperate with frame 30 (130) so that the frame can be snap-fit closed onto support 20 (120). The rim 32 (132) of frame 30 (130) extends only over a fraction of flange 21 (121) leaving part 22 (122) of the flange and the central part (5, 105) of support 20 (120) uncovered.

12 Claims, 12 Drawing Sheets

RECLOSABLE RIGID CONTAINER ASSEMBLY

TECHNICAL FIELD

The present invention relates to a rigid or semi-rigid container assembly and to the reclosable hermetically sealed package obtained therefrom.

BACKGROUND ART

Hermetically sealed rigid or semi-rigid containers, such as trays with a flexible lid sealed around their edges, are widely used in the packaging of food products. This type of packaging offers several advantages: the rigidity of the container provides protection to the contents of the package during transportation, storage and handling, and the hermeticity of the seals contributes to the increase in the shelf-life of the product. In many cases the packaged product is not immediately consumed after opening of the package, forcing the consumer to time-consuming repackaging operations. A reclosable package would therefore be very convenient.

Several attempts have been made in the past to provide reclosable rigid or semi-rigid packages. By way of example, EP-A-1,127,809 describes a food package comprising a container and a cover, said cover being formed by a peripheral clamping element and a lid sealed onto the peripheral clamping element. The lid and the peripheral clamping element are firstly joined together, for instance by injection moulding the peripheral clamping element around the lid, and then joined to the container by sealing the lid to the flange of the container. Alternatively the peripheral clamping element is firstly sealed, welded or glued onto the flange of the container and then the lid is sealed onto the peripheral clamping element. In both cases two separate sealing steps, with two separate sealing tools, are required to hermetically seal the container.

As another example, FR 2,827,841 proposes the use of a composite cover for the closure of a packaging container comprising a peripheral frame whose central opening is closed with a film, whereby an easy-to-open seal is formed between the film and the rim of the packaging container. The packages described in the previous documents are easy to open and can be tightly reclosed due to the cooperation between the peripheral element and the rim of the container but share the disadvantage of requiring separate steps for their assembly, such as the separate assembly of the peripheral element and the film or the need for separate sealing operations, making the whole process cumbersome and costly.

On the other hand FR 2,618,411 describes a package composed of a rigid single-piece container having a ring moulded around its flange and a film sealed onto both the ring and the flange of the container. To open the package the ring is broken away from the flange of the container and the film peeled away from the flange. However, once reclosed, the package of this invention does not offer the required degree of reliability as there is no engagement between the frame and the flange of the container.

Therefore the need still exists for a rigid or semi-rigid container assembly and a package made therewith which can be produced in a limited number of steps, which can be hermetically sealed and which can be tightly and reliably reclosed after opening.

A first objective of the present invention is therefore to provide a rigid or semi-rigid container assembly for the packaging of food products which is reclosable and easy to use. Another objective is to provide a method of packaging a food product by means of the rigid or semi-rigid container assembly and a thermoplastic film sealed onto it to obtain a reclosable package. A further objective of the present invention is to provide a reclosable package comprising the rigid or semi-rigid container assembly, a product placed therein and a hermetically sealed lid in contact with the product.

DISCLOSURE OF THE INVENTION

A first object of the present invention is a rigid or semi-rigid container assembly comprising a support and a frame, wherein the frame extends over a fraction of the periphery of the support leaving the central area of said support uncovered, and it is shaped to releasably engage with the periphery of the support.

A second object of the present invention is a method of packaging a food product by means of the reclosable rigid or semi-rigid container assembly of the first object comprising the steps of: providing the container assembly with the frame releasably engaged with the support and a product loaded onto the support, closing the container assembly by securing a thermoplastic film to the frame of the assembly and to at least part of the periphery of the support of the assembly not covered by the frame, wherein the seal to said periphery of the support extends in a continuous manner around said periphery to ensure hermeticity of the package.

A third object of the present invention is a reclosable package comprising the rigid or semi-rigid container assembly of the first object, a product loaded therein and a thermoplastic film laid over the product and in contact with it in at least one point and sealed to the support and to the frame of the assembly, wherein said film forms a first seal with the frame and a second seal with the support.

These and other objects, advantages, and features of the invention will be more readily understood and appreciated by reference to the detailed description of the invention and the drawings.

BRIEF DESCRIPTION OF DRAWINGS

FIG. 1 is a perspective view of a container assembly according to one embodiment of the present invention in the open state;

FIG. 2 is a section of the container assembly of FIG. 1 in the closed state;

FIG. 3 is a section of a container assembly according to a second embodiment of the present invention in the closed state;

FIG. 4 is a section of a container assembly according to a third embodiment of the present invention in the closed state;

FIG. 5 is a section of a container assembly according to a fourth embodiment of the present invention in the closed state;

FIG. 6 is a section of a container assembly according to a fifth embodiment of the present invention in the closed state;

FIG. 7 is a perspective view of a container assembly according to a sixth embodiment of the present invention in the closed state;

FIG. 8 is an enlargement of a package made with the container assembly of FIG. 2;

FIG. 9 is a schematic view of the sealing step of the packaging method according to the present invention;

FIG. 10 is a section of a package according to one embodiment of the present invention;

FIG. 11 is a section of the package according to a second embodiment of the present invention;

FIG. 12 is a perspective view of a package according to one embodiment of the present invention in the open state;

FIG. 13 is a perspective view of a package according to another embodiment of the present invention in the open state.

MODE(S) FOR CARRYING OUT THE INVENTION

Figure 001:
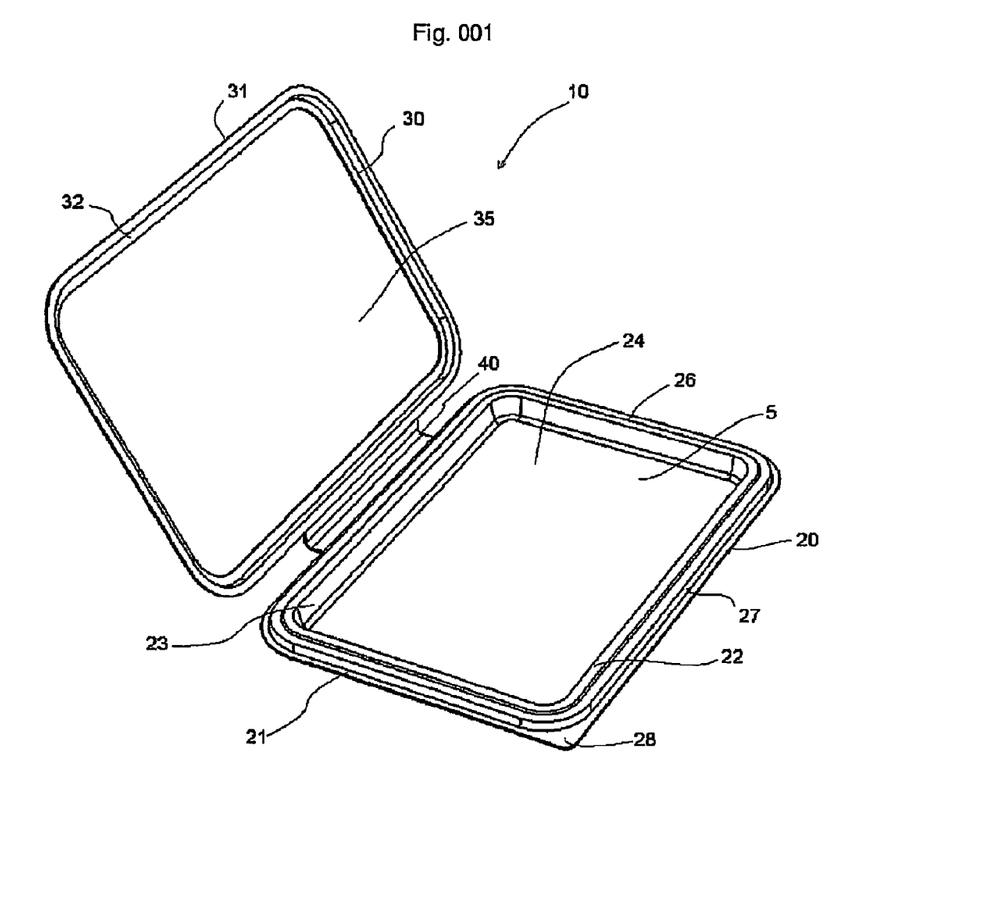
Figure 002:
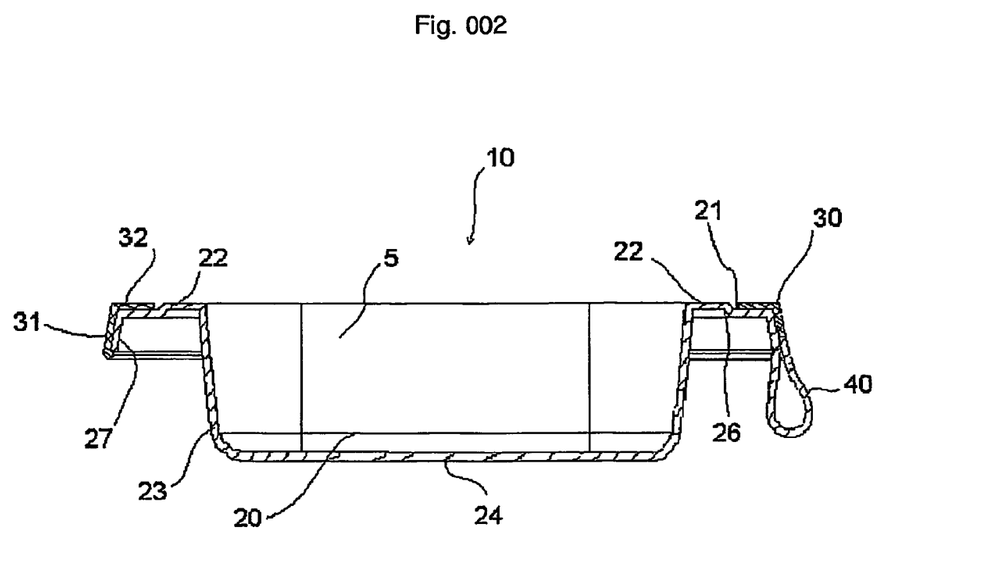

With reference to FIGS. 1 and 2, which represent one embodiment of the rigid or semi-rigid container assembly of the present invention in the open and closed state respectively, container assembly 10 comprises a support 20 and a frame 30. Support 20 comprises a flat bottom wall 24 and upwardly extending side-walls 23. A flange 21 extends outwardly of side-walls 23 forming the periphery of support 20. Flange 21 comprises horizontal surface 26 and skirt 27 which extends around the sidewalls of support 20. Frame 30 includes a flat rim 32 and a skirt 31, which is shaped to engage with flange 21 of support 20 when the container assembly is in the closed state. When frame 30 is engaged with support 20, rim 32 of frame 30 covers only a fraction of flange 21 of support 20 leaving a portion 22 of flange 21 uncovered. Frame 30 defines a central opening 35, so that, when container assembly 10 is in the closed state, the central part 5 of support 20 remains uncovered by frame 30 and products can be as easily loaded onto the support as they would be onto any conventional container. When container assembly 10 is in the closed state it is also possible to neatly stack one assembly into the other, as generally done with rigid or semi-rigid containers. This offers two major advantages: the container assemblies of the present invention can be stored and shipped in a most space-efficient way and once they arrive at the packaging facility they can be fed to the packaging machine by any conventional loading equipment.

Figure 003:
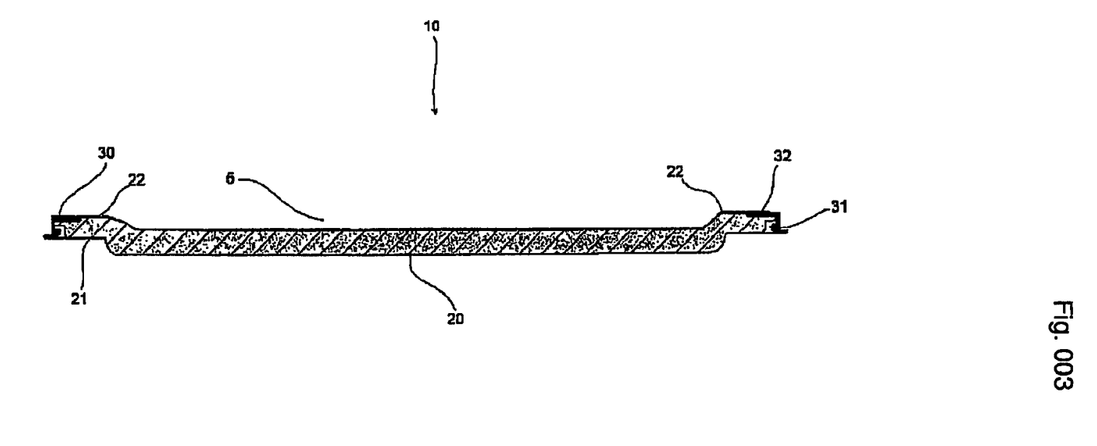

In the embodiment shown in FIG. 1 container assembly 10 has a rectangular shape however any other desired shape, such as square, round, elliptical etc., can be forseen for the container assembly 10. Support 20 can be either in the form of a tray, with a bottom wall and upwardly extending side-walls (as shown in FIG. 2) or in the form of a flat or substantially flat dish, as shown in FIG. 3.

Typically the width of flange 21 ranges from 4 to 15 mm, preferably from 4 to 12 mm, and even more preferably from 5 to 10 mm.

Figure 004:
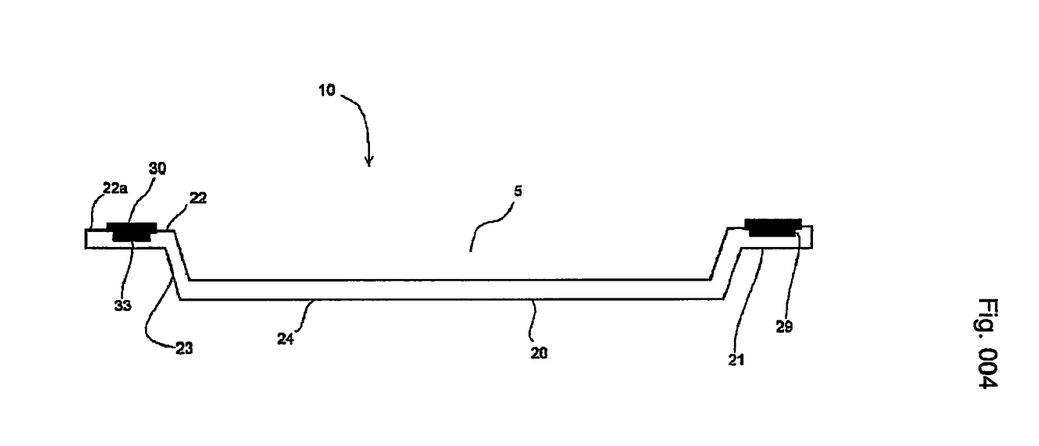

FIG. 4 shows a second embodiment of the container assembly of the invention in the closed state comprising a tray-like support 20 and a frame 30. Support 20 comprises a flat bottom wall 24 and upwardly extending side-walls 23 terminating in a horizontal outwardly extending flange 21, which forms the periphery of support 20. In the embodiment shown in FIG. 4 frame 30 covers only the central portion of flange 21, leaving both the inner and the outer edges (22 and 22a) of flange 21 uncovered as well as open mouth 5 of support 20 unhindered. Frame 30 releasably engages with flange 21 by means of an interlocking groove-projection mechanism whereby projection 33 on frame 30 fits into groove 29 on flange 21.

Figure 005:
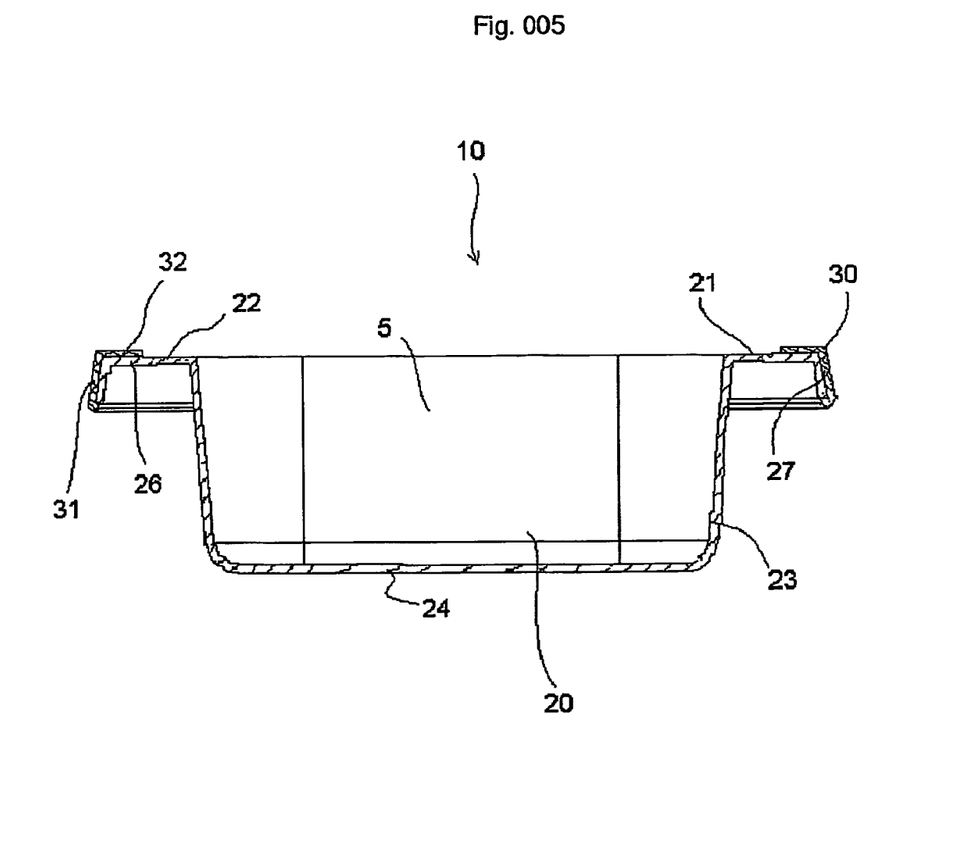
Figure 006:
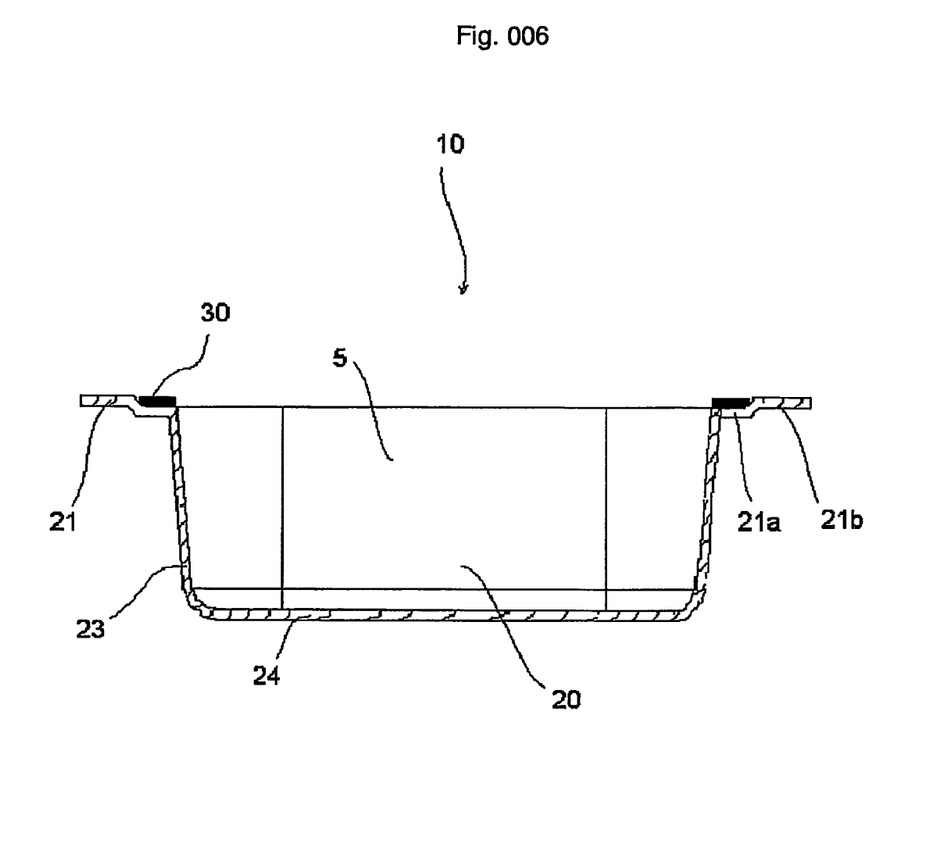

FIGS. 5 and 6 show two further embodiments of the container assembly of the invention in the closed state having different engagement mechanisms between frame 30 and support 20. In FIG. 5, flange 21 of support 20 extends outwardly from the side-walls 23 with horizontal surface 26 and downwardly, forming skirt 27 which extends around the side-walls of the support 20. Horizontal surface 26 is flat and skirt 27 is shaped at its edge to cooperate with frame 30. Frame 30 includes a flat rim 32 and a skirt 31, which is shaped to engage with skirt 27 on the support 20 when the container assembly is in the closed state. Rim 32 extends only over a portion of the horizontal surface 26, thereby leaving the remaining part 22 of the horizontal surface uncovered as well as open mouth 5 of support 20 unhindered. In FIG. 5, portion 22 represents about 50% of the total extension of horizontal surface 26.

In FIG. 6, flange 21 extends outwardly from side-walls. Flange 21 includes an inner lower step part 21a and an outer upper step part 21b. The outer upper step part 21b is shaped at its internal edge to cooperate with frame 30 so that the frame can be snap-fit closed onto support 20. The width of frame 30 matches the width of inner lower step part 21a of the flange 21, so that, when the container assembly is in the closed state, frame 30 snugly fits onto the flange of the support 20. The person skilled in the art recognizes that other alternative engagement mechanisms between frame 30 and flange 21 can be provided without departing from the scope of the invention.

Figure 007:
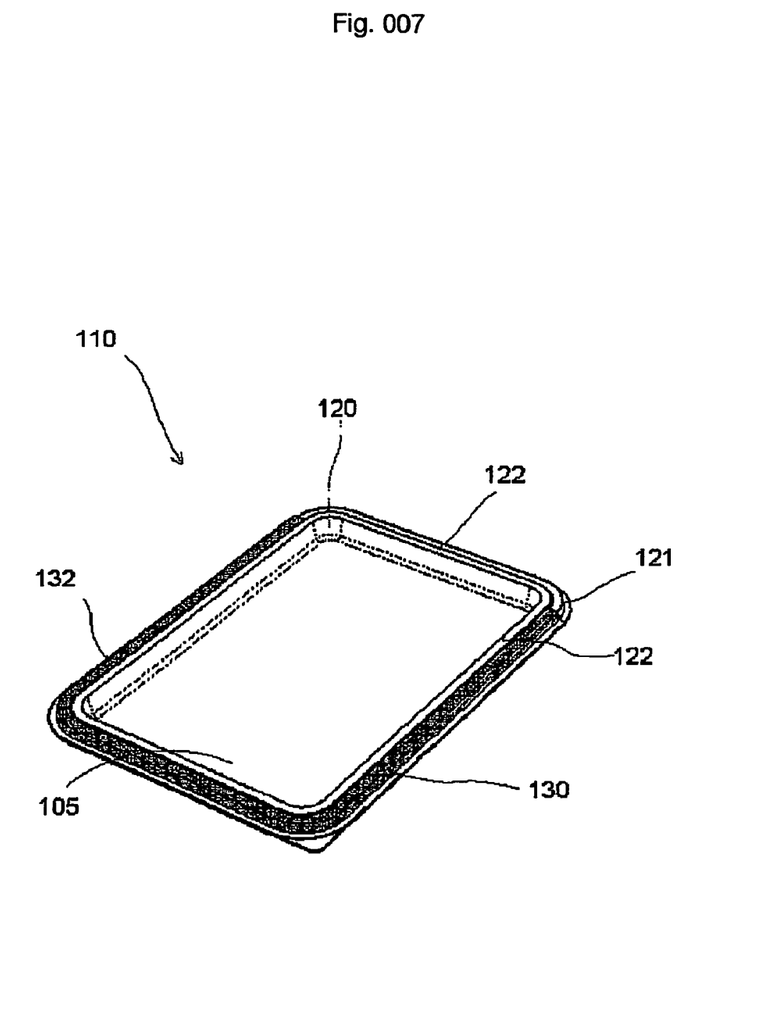

Generally, frame 30 of container assembly 10 is a continuous construction, extending around the whole periphery of support 20, as shown in FIG. 1. However it is possible to have an incomplete frame extending over a major proportion of the periphery of the support. For example, in the embodiment shown in FIG. 7, frame 130 extends over three sides of support 120 leaving one complete side of flange 121 and area 122 of flange 121 along the remaining three sides uncovered and mouth 105 of support 120 unhindered.

In the embodiment of the invention shown in FIG. 1 support 20 and frame 30 are connected by one hinge 40, although more than one hinge can be present. In a second embodiment of the invention, shown in FIG. 3-7, support 20 (120) and frame 30 (130) are not connected by any hinge. In FIG. 1 flange 21 is provided with tab 28 which can be grasped for separating the frame 30 from support 20. In an alternative embodiment, not shown in the figures, frame 30 is provided with a tab 28 or both flange 21 and frame 30 are provided with tabs with slightly different sizes to facilitate opening of the end package.

Support 20 and frame 30 of the container assembly can either be made of the same material or they can be made of different materials. Suitable materials for both the support and the frame are single layer or multi-layer thermoplastic materials, but other materials commonly employed in food packaging could be used, such as plastic coated paperboard or cardboard. In case of a single layer structure suitable thermoplastic materials are for instance polystyrene, polypropylene, polyesters, high density polyethylene, poly(phenylene oxide), polylactic acid), PVC and the like, either foamed or solid. In case of a multi-layer structure suitable materials are for instance polyolefins, modified polyolefins, polyamides, polystyrene, polyesters, poly(lactic acid), (ethylene-co-vinyl alcohol) copolymers, polyvinylidene chloride, PVC and the like. Part of the multi-layer structure can be solid and part can be foamed.

In one embodiment support 20 and frame 30 are made of the same multi-layer thermoplastic material comprising at least one substrate layer, optionally one oxygen barrier layer and one heat-sealable surface layer. In a first preferred aspect of said embodiment the substrate layer is of foamed polypropylene, foamed polystyrene or foamed polyester. The thickness of the substrate layer is typically comprised between 100 and 3,000 µm, preferably between 300 and 1,000 µm. The oxygen barrier layer, if present, comprises any of the polymers known in the art for their oxygen barrier properties, such as (ethylene-co-vinyl alcohol) copolymers, polyvinylidene chloride and polyamides. The thickness of the oxygen barrier layer, if present, will be set in order to provide the overall laminate with an Oxygen Transmission Rate (evaluated by following the method described in ASTM D-3985 and using an OX-TRAN instrument by Mocon) at 23° C. and 0% of relative humidity that it is lower than 250, preferably lower than 150 and even more preferably lower than 100 cc³/m².d.atm. Typically when (ethylene-co-vinyl alcohol) copolymers and polyvinylidene chloride are used as the oxygen barrier materials this is achieved with barrier layers 3-8 μm thick. The heat-sealable surface layer comprises materials chosen from the group of ethylene homo- and co-polymers, propylene homo- and co-polymers, ionomers and the like as well as blends of these polymers in any proportions. Suitable blends for the heat-sealable layer also include peelable blends. The thickness of the heat-sealable surface layer is typically comprised between 2 and 80 μm, more preferably from about 2 to about 50 μm. Additional layers can be present such as tie or adhesive layers, bulk layers and the like. In a second preferred aspect of said embodiment the substrate layer of the multi-layer material is chosen from the group of polystyrene, polyesters, polypropylene, polyethylene, polyamide and the like.

Support 20 and frame 30 of the container assembly can be moulded by any technique known in the art, such as thermoforming, injection moulding, hot stamping, compression moulding and the like. They can be moulded either at the same time, in a one-step operation, starting from the same material or separately from the same or different materials. In the latter case, support 20 and frame 30 can still be connected by one or more hinges 40, for instance by joining together flaps of material integrally and hingeably formed on both support 20 and frame 30 by adhesive, heat-sealing, ultrasonic welding or any other suitable polymer joining process known in the art.

A second object of the present invention is a method of packaging a food product in the rigid or semi-rigid container assembly 10, comprising the steps of:

providing container assembly 10 with frame 30 engaged with support 20, and a product 80 loaded thereon;

placing a thermoplastic film 60 over the container assembly 10 and product 80;

optionally evacuating and/or gas flushing with a suitably selected purging gas or gas mixture the area between thermoplastic film 60 and support 20; and sealing film 60 over rim 32 of frame 30 and on the part 22 of flange 21 of the support 20 not covered by rim 32.

Frame 30 of container assembly 10 can be engaged to support 20 after or, more preferably, before the product to be packaged is loaded onto the support. In the latter case this can be done right before the packaging operations take place or, more preferably, by the supplier of container assembly 10 at his own production facility.

In more details, container assembly 10 with frame 30 engaged with support 20 is placed in a container-like countersupport present in a suitable packaging machine. The product to be packaged is loaded into the container through the central opening 35 defined by frame 30 and through open mouth 5 of support 20. This can be done either manually or by means of a tray loading apparatus. A thermoplastic film 60 is then positioned over container assembly 10 and product 80. Thermoplastic film 60 can be in the form of a continuous web or can be supplied in the form of separate individual die-cut lids of a suitable size and shape. Different types of thermoplastic films are known and may be suitably employed depending upon the product and the desired characteristics of the final package. Also depending on the nature of the product to be packaged it may be desirable to either create a vacuum or modify the atmosphere inside container assembly 10 before sealing thermoplastic film 60. The atmosphere can be modified either by simply flushing container assembly 10 with product 80 loaded therein with a suitable gas or gas mixture or by firstly evacuating it and then back-filling with a suitable gas or gas mixture. The gas or the gas mixture are selected to maximize the shelf-life of the product being packaged. Preferred gases to replace evacuated air include oxygen, carbon dioxide, nitrogen, argon and mixtures thereof. Once this step has been completed, thermoplastic film 60 is then sealed over container assembly 10. When the atmosphere inside the package has been modified or a vacuum has been created, thermoplastic film 60 is preferably chosen to have a low permeability to gases in order to maintain the atmosphere inside the package unchanged for the whole shelf-life of the product.

Figure 008:
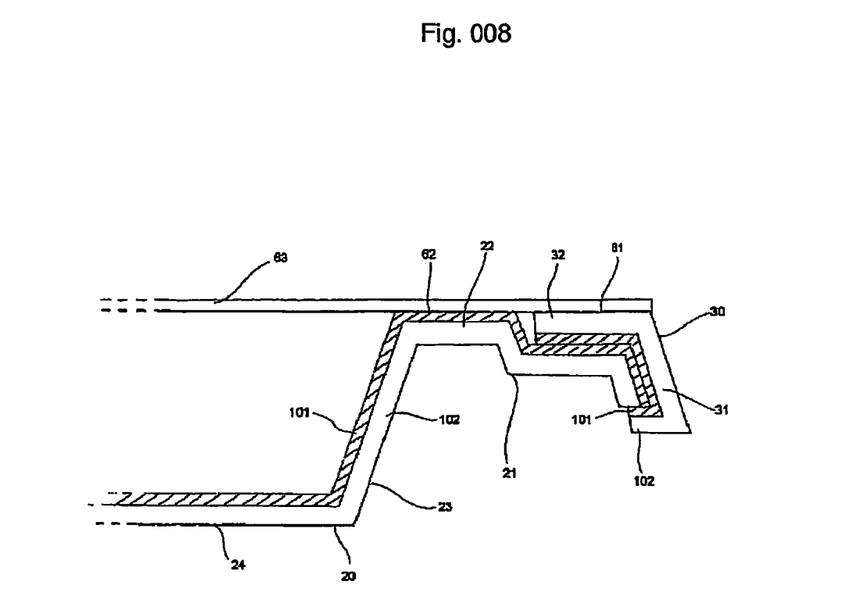

In the method of the present invention, thermoplastic film 60 forms a first seal 61 with rim 32 of frame 30 and a second seal 62 with part 22 of the flange of the support not covered by rim 32, as shown in FIG. 8. Generally both seals 61 and 62 extend around the whole perimeter of rim 32 of frame 30 and of part 22 of flange 21, respectively. Alternatively, it is preferred that at least seal 62 extends in a continuous manner around part 22 of flange 21 to ensure hermeticity of the package. To facilitate opening of the final package by the consumer seal 62 is preferably a peelable seal. As used herein the term "peelable seal" refers to a seal which is strong enough to guarantee the hermeticity of the package during its life-cycle but which can be easily opened by tearing apart by hand the two materials that were joined by the seal. Peelable seals can be obtained, for instance, by sealing together layers of poorly compatible materials or by forming at least one of the layers of the materials joined by the seal with a blend of immiscible or partly immiscible materials. Said layer can be either a heat-sealable surface layer or a layer adjacent to the heat-sealable surface layer and characterized by low cohesive strength. Similar blends are often referred to as "peelable blends". Similarly, the force required to tear apart the two layers is usually referred to in terms of "peel force". A method of measuring the peel force is described in ASTM F-88-00. Acceptable peel force values for peelable seals usually range from 1,900 g/25 mm to 700 g/25 mm. The force required to peel thermoplastic film 60 from the container assembly at seal 61 can be comparable to, or preferably higher than the force required to peel thermoplastic film 60 from the container assembly at seal 62.

In one embodiment of the method of the present invention seal 61 is a permanent seal, that is a seal that can not be opened without causing the physical destruction of at least one of the materials joined by the seal. Several methods can be employed to form a permanent seal 61 and a peelable seal 62 between thermoplastic film 60 and container assembly 10. For instance, support 20 and frame 30 of container assembly 10 could be made of the same multi-layer thermoplastic laminate, which comprises two outer layers, indicated in FIG. 8 as 101 and 102, of different materials. The support 20 will have an innermost food contact layer 101 and an outermost layer 102. The frame 30, of the same laminate, will be positioned with layer 101 in contact with layer 101 of support 20 and with layer 102 facing thermoplastic film 60. The heat-sealable surface layer of thermoplastic film 60 will then be suitably chosen to form a permanent seal with the outer layer 102 of frame 30 and a peelable seal with the inner heat-sealable layer 101 of support 20. As an example, container assembly 10 could be made of a laminate having at least one outermost layer 102 made of propylene homo- or co-polymers and one innermost food contact layer 101 made of a material selected to give a peelable seal with polyolefins, such as a "peelable blend". Suitable materials for layer 101 are for instance Steripeel® WD165CF and Borpeel® WD255CF both sold by Borealis, those sold by DuPont under the trade-name Appeel®, ternary blends comprising polybutylene, LDPE and LLDPE and the like. Preferably, the heat-sealable surface layer of film 60 is made of propylene co-polymers, ethylene co-polymers or blends thereof.

Alternatively, the area 22 of the flange of support 20 not covered by rim 32 could be embossed so that, regardless of the compatibility between the sealing surface of film 60 and the inner heat-sealable layer of container assembly 10, the seal in the roughened surface could be easily openable.

In still another method the sealing frame of the packaging machine could be formed by two separate concentric frames: the frame sealing thermoplastic film 60 onto rim 32 of frame 30 operating at a temperature and/or pressure selected to produce a strong seal 61 and the frame sealing thermoplastic film 60 onto the area of the flange 22 not covered by rim 32 operating at a lower temperature and/or pressure, therefore making a weaker, easy to open seal 62.

Thermoplastic film 60 may be a single layer or a multi-layer structure. In case of a single layer structure suitable polymeric materials are for instance ethylene homo- and co-polymers, propylene homo- and co-polymers, ionomers, polyamides, polyesters, polystyrene, poly(lactic acid) and the like. In case of a multi-layer structure suitable materials for the layer that will be sealed to the container assembly (the heat-sealable layer) are as indicated above. Optionally thermoplastic film 60 can be coupled to layers of materials other than plastic materials, such as aluminum foil, paper or cardboard. The various layers can be bonded together by any conventional and suitable method, e.g. coextrusion, extrusion coating, lamination etc. In both cases to obtain hermetic seals thermoplastic film 60 or its heat-sealable layer, in case of a multi-layer structure, must be selected to have a certain degree of chemical compatibility with the surface of container assembly 10. Thermoplastic film 60 can be either oriented or non-oriented and in the former case it can be either heat-shrinkable or non heat-shrinkable. In one embodiment of the present invention thermoplastic film 60 is substantially impermeable to oxygen, that is it has an Oxygen Transmission Rate (evaluated by following the method described in ASTM D-3985 and using an OX-TRAN instrument by Mocon) at 23° C. and 0% of relative humidity that is lower than 200, preferably lower than 150 and even more preferably lower than 80 $cc^3/m^2.d.atm$. This can be achieved by using a thermoplastic film 60 comprising a polymeric material which has oxygen barrier properties such as (ethylene-co-vinyl alcohol) copolymers, polyvinylidene chloride and polyamides.

In a first preferred embodiment of the packaging method of the present invention thermoplastic film 60 is an oriented and heat-shrinkable film and the method further comprises subjecting thermoplastic film 60 to a sufficiently high temperature to shrink it either after thermoplastic film 60 is sealed to the container or during said sealing step.

In one aspect of said embodiment, support 20 (120) of container assembly 10 (110) is in the form of a shallow tray or a flat dish, wherein the term "shallow tray" is used to indicate a tray having a depth, that is a distance between flange 21 (121) and bottom wall 24 (124) of the tray, not greater than 20 mm. Support 20 (120) is generally made of foamed thermoplastic material, such as foamed polystyrene, foamed polypropylene or foamed polyester, laminated with a heat-sealable, optionally oxygen impermeable, material. Frame 30 (130) can be made either of the same material as support 20 (120) or of a different material, for instance rigid polyethylene.

Oriented heat-shrinkable film 60 generally comprises one heat-sealable surface layer, one oxygen barrier layer and one outer heat-resistant layer, the heat-sealable and the oxygen barrier layers being as indicated above and wherein the outer heat-resistant layer is made, for instance, from materials chosen from the group of polypropylene, polyethylene, polyesters and polyamides.

Figure 009:
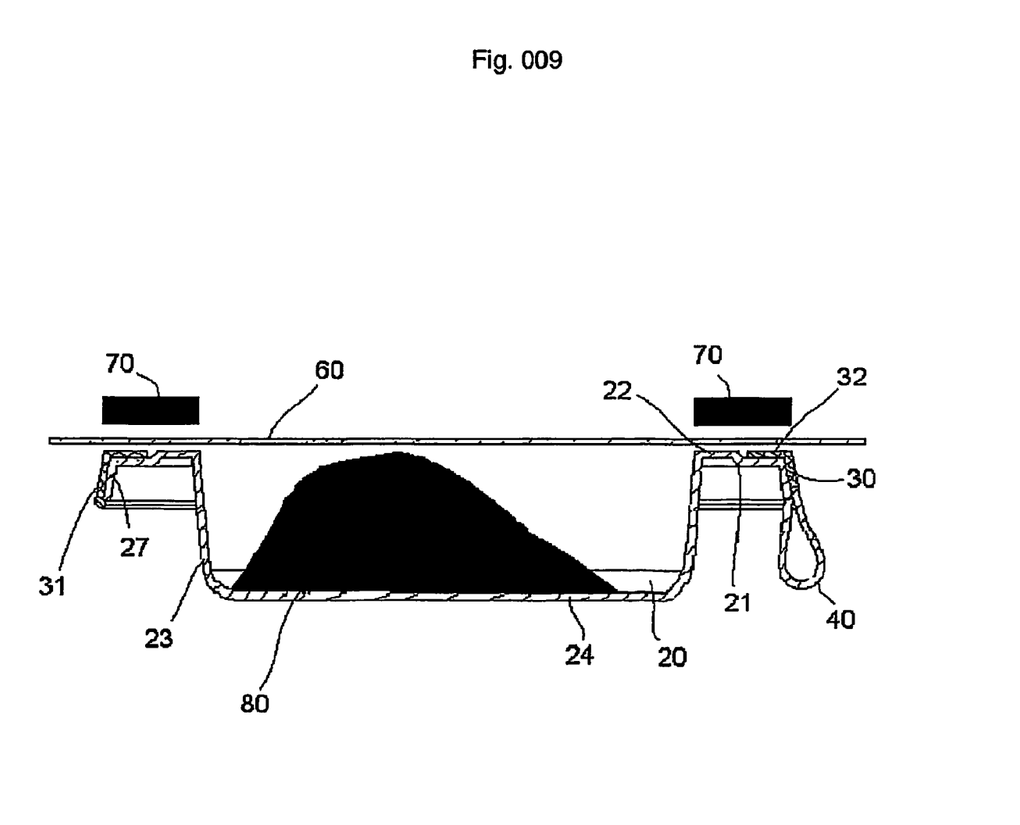

This packaging method can be performed on currently available tray lidding machines, either automatic or manual, commercially supplied by, e.g., Ross Industries, Inc., Multivac, Inc. or Mondini S.p.A. with only minor modifications. Specific examples of suitable models include the Multivac® T550 or the Mondini Evoluzione Super. In this type of machines sealing of the thermoplastic film onto the sealing surface of the support is carried out by means of a sealing frame, which forms a continuous seal around the perimeter of the sealing surface of the support. Sealing can be accomplished by any method known in the art, for instance by hot-bar, impulse, RF etc. In one embodiment of the present invention, shown in FIG. 9, the sealing section of sealing frame 70 is as wide as the flange 21 of support 20, so that a continuous seal can be formed between the thermoplastic film and both the rim 32 of frame 30 and the part 22 of the flange of support 20 not covered by rim 32. The sealing section of sealing frame 70 can have a flat profile with square edges, as shown in FIG. 9, or any other suitable profile, such as flat with rounded edges, step-like etc. As an alternative, sealing frame 70 can be formed by two separate concentric frames: one for sealing thermoplastic film 60 onto rim 32 of frame 30 and one for sealing thermoplastic film 60 onto part 22 of the flange of support 20 not covered by rim 32. Thermoplastic film 60 may be cut to the desired size at any time, prior to, during or after it is sealed to container assembly 10, forming film portion 63 which is secured to the assembly by means of seals 61 and 62. In a preferred method cutting is accomplished immediately after sealing by means of a cutting frame which encircles sealing frame 70, or by means of a heated knives. Shrinking of thermoplastic film 60 can be accomplished either by means of hot water or, preferably, by means of hot air.

In a second preferred embodiment of the packaging method of the present invention thermoplastic film 60 placed over the container assembly 10 and product 80, is first heated and stretched upwardly away from the product, the area between thermoplastic film 60 and support 20 is evacuated, thermoplastic film 60 is then allowed to drape over product 80 and is sealed on rim 32 of frame 30, on part 22 of the flange of support 20 not covered by rim 32 and on the part of support 20 not covered by product 80. Optionally, after the evacuation step has been completed, a suitably selected purging gas or gas mixture could be flushed over the product to generate a very low residual gas pressure into the package.

Preferably, in said second preferred embodiment of the packaging method, thermoplastic film 60, softened by heating, is stretched against the dome of a vacuum skin packaging chamber by means of vacuum applied to the area between thermoplastic film 60 and said dome. Draping of said film over and around product 80 is accomplished by releasing the vacuum pulling on thermoplastic film 60.

Figure 010:
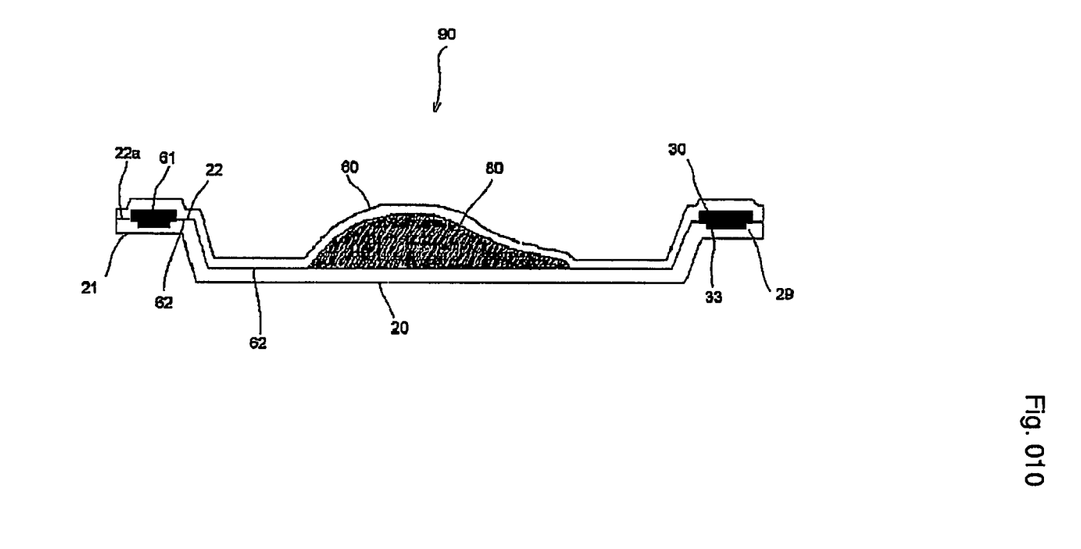

As shown in FIG. 10, at the end of the packaging process thermoplastic film 60 forms a tight skin around product 80, touching almost the whole surface of product 80 not in contact with support 20. Thermoplastic film 60 forms a peelable seal 62 with the area of support 20 not covered either by product 80 or by frame 30 and it forms a seal 61 with rim 32 of frame 30. Several methods can be employed to form peelable seal 62. For instance support 20 could be made from a multi-layer structure comprising a thin heat-sealable food-contact layer adjacent to a layer consisting of a blend of resins having a low cohesive strength. Blends with low cohesive strength that can be used are for instance those described in WO99/54398. An alternative method could be to select the heat-sealable layers of both thermoplastic film 60 and support 20 to obtain a peelable seal. Suitable combination of heat-sealable layers are for instance those described in WO 02/62575.

Generally both support 20 and thermoplastic film 60 comprise at least one layer of an oxygen impermeable material. Preferably support 20 is made of a rigid or semi-rigid multilayer film which can be easily thermoformed. Frame 30 can be made either of the same material as support 20 or of a different one. When frame 30 is made of the same material as support 20 selective opening, that is peeling of seal 62 between thermoplastic film 60 and support 20 and keeping of seal 61 between frame 30 and thermoplastic film 60, is possible because of the lower stress to which seal 61 is subjected when the package is opened. Thermoplastic film 60 is generally a non-oriented material with good formability.

The packaging method of the invention could be performed on currently available Vacuum Skin Packaging (VSP) machines, like the Multivac® CD6000 machine, by introducing minor modifications. In this type of machines a first web of material is thermoformed into the support part of the package, then the product is loaded and the supported product is advanced to a vacuum chamber where the top film is heated, stretched and then sealed to the support under vacuum. According to one possible modification of such process, after thermoforming of support 20 and before loading of product 80, separately produced frame 30 could be engaged onto support 20. According to another possible modification, container assemblies 10 with frame 30 engaged onto support 20 could be fed directly to the product loading section of a VSP machine, by replacing the thermoforming section of the machine with a conventional tray loading apparatus.

Figure 011:
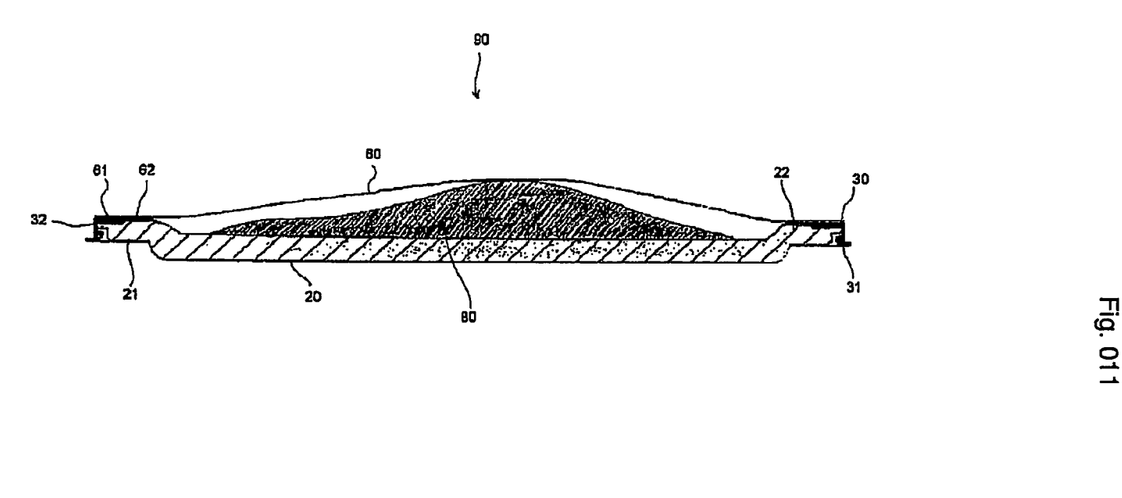

A third object of the present invention is a rigid or semi-rigid reclosable package obtained from container assembly 10, product 80 and thermoplastic film 60. With reference to FIGS. 10 and 11, which represent two embodiments of the package of the present invention, package 90 comprises a rigid or semi-rigid container assembly 10, comprising support 20 and frame 30 engaged with support 20, a product 80 loaded therein and a thermoplastic film 60 in contact with product 80 in at least one point and sealed onto container assembly 10.

In the embodiment shown in FIG. 10 thermoplastic film 60 is sealed with a first seal 61 onto rim 32 of frame 30 and with a second peelable seal 62 onto the whole area of support 20 not covered by product 80 or frame 30.

In the embodiment shown in FIG. 11 thermoplastic film 60 is sealed onto rim 32 of frame 30 and on part 22 of the flange of support 20 not covered by rim 32. Thermoplastic film 60 forms a first seal 61 with rim 32 of frame 30 and a peelable seal 62 with part 22 of the flange of support 20 not covered by rim 32 of frame 30.

Figure 012:
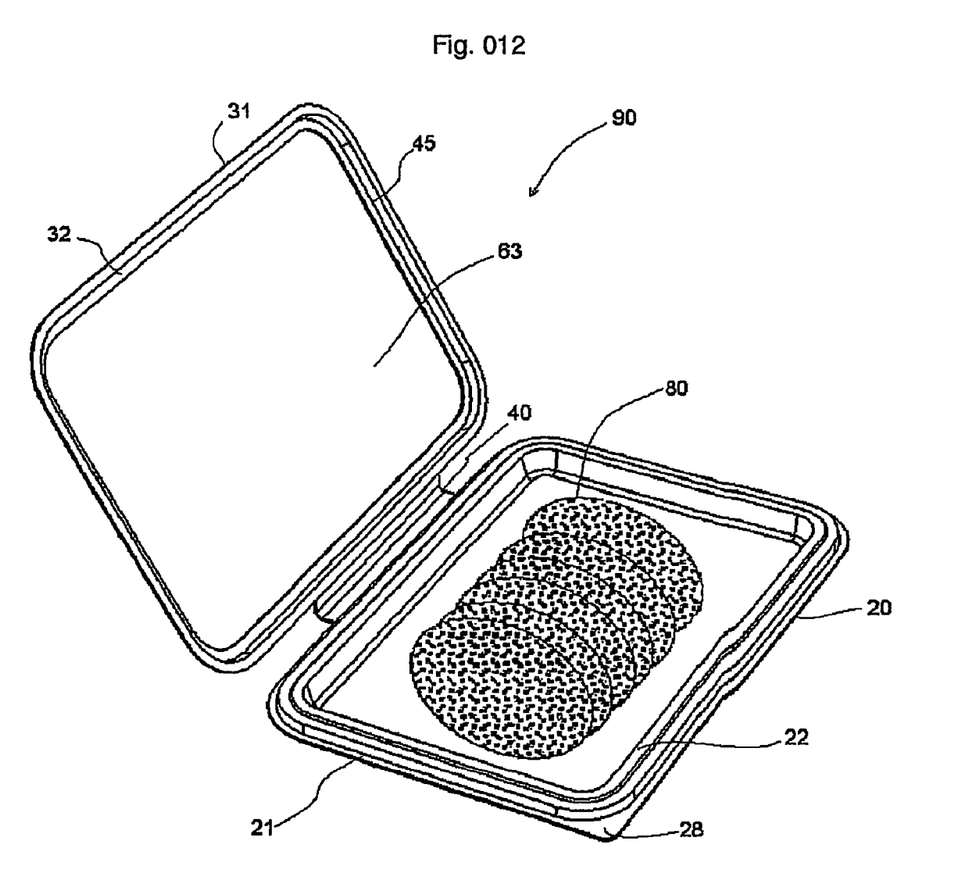

Package 90 can be opened by disengaging frame 30 from flange 21, peeling seal 62 open and lifting frame 30 away from support 20. As shown in FIG. 12, once peelable seal 62 has been opened, portion 63 of thermoplastic film 60 remains secured to frame 30 by means of seal 61 thus forming a unitary, self-standing lid 45. Lid 45 can be used to reclose package 90, providing optimal storage conditions for product 80 even after the package has been opened.

Figure 013:
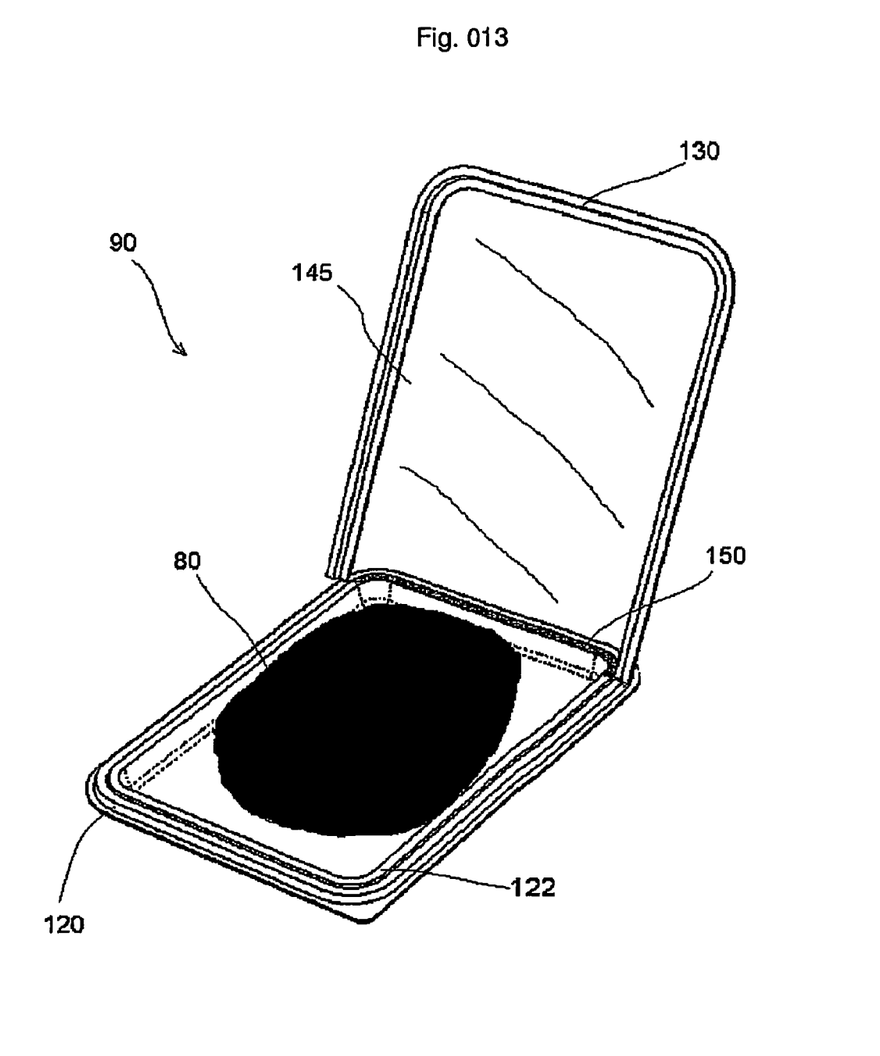

FIG. 13 represents a further embodiment of the package of the invention wherein frame 130 extends only partially around support 120. When opened, lid 145 is lifted from support 120 only along the three sides of the frame and remains joined to support 120 along the fourth side 150. This can be accomplished for instance by using one sealing condition to seal thermoplastic film 60 onto rim 132 of frame 130 and area 150 and a second "milder" condition to seal thermoplastic film 60 onto part 122 of flange 121.

The container assembly of the invention offers a simple and economical solution to the problem of providing rigid or semi-rigid reclosable containers. In fact, by simply sealing a thermoplastic film over the container assembly of the invention, it is possible to obtain a package which is hermetically sealed during the distribution and sale cycle, that can be easily opened and that can be repeatedly reclosed. As a further advantage the container assembly of the invention can be handled with the same equipment used for conventional tray-like containers without the need of major modifications.

The invention claimed is:

1. A rigid or semi-rigid container assembly (10, 110) comprising a support (20, 120) and a frame (30, 130), wherein the support (20, 120) comprises a peripheral flange (21, 121) outwardly extending from the support (20, 120) and an open mouth (5, 105), and the frame (30, 130) comprises a rim (32, 132), which is shaped to cooperate with the flange (21, 121) to be releasably secured onto the support (20, 120) when the container assembly (10, 110) is in a closed state, characterized in that the rim (32, 132) of the frame (30, 130) extends only over a fraction of the flange (21, 121), thus leaving at least an inner edge part (22, 122) of the flange (21, 121) not covered by the rim (32, 132) of the frame (30, 130), wherein the frame defines a central opening (35) which leaves the open mouth of the support uncovered by the frame when the container assembly is in the closed state, and the open mouth of the support remains uncovered in the closed state so that products can be loaded onto the support through the central opening of the frame, and wherein both the rim of the frame and the part of the flange not covered by the rim have a flat shape and are thus adapted to form a seal with a thermoplastic film.

2. The container assembly (10, 110) according to claim 1 wherein the support (20, 120) comprises a flat bottom wall (24, 124), upwardly extending side-walls (23, 123), and the flange (21, 121) extending outwardly from the side-walls.

3. The container assembly (10) according to claim 1 wherein the frame (30) extends around the whole perimeter of the support (20).

4. The container assembly (110) according to claim 1 wherein the frame (130) is incomplete and extends around a major portion of the perimeter of the support (120).

5. The container assembly (10) according to claim 1 wherein the frame (30) further comprises a skirt (31, 131).

6. A package (90) comprising a rigid or semi-rigid container assembly (10, 110) according to claim 1, a product (80) placed therein and a thermoplastic film (60) placed over the container assembly (10, 110) and the product (80) and sealed on the rim (32, 132) of the frame (30, 130) and on the part (22, 122) of the flange of the support (20, 120) not covered by the rim (32, 132) of the frame (30, 130), characterized in that the thermoplastic film (60) contacts the product (80) in at least one point.

7. The package according to claim 6 wherein the thermoplastic film (60) forms a permanent seal (61) with the rim (32, 132) of the frame (30, 130) and a peelable seal (62) with the part (22, 122) of the flange of the support (20, 120) not covered by the rim (32, 132) of the frame (30, 130).

8. The package according to claim 6 wherein the thermoplastic film (60) forms a tight skin around the product (80) and is additionally sealed onto the whole area of the support (20, 120) not covered by the product (80).

9. The package according to claim 8 wherein the thermoplastic film (60) forms a permanent seal (61) with the rim (32, 132) of the frame (30, 130) and a peelable seal (62) with the part of the support (20, 120) not covered by the rim (32, 132) of the frame (30, 130) or the product (80).

10. The container assembly according to claim 1, wherein
the rim of the frame is further adapted to form a permanent seal with the thermoplastic film; and
the part of the flange not coved by the rim is further adapted to form a peelable seal with the thermoplastic film.

11. The container assembly according to claim 10, wherein the part of the flange not coved by the rim is further adapted to form a hermetic seal with the thermoplastic film.

12. The container assembly according to claim 1, wherein the rim is reclosably secured on the flange.

* * * * *